United States Patent [19]

Olmstead

[11] Patent Number: 5,408,548
[45] Date of Patent: Apr. 18, 1995

[54] OPTICAL SWITCHES

[76] Inventor: Charles H. Olmstead, 18 Kinsley Rd., Acton, Mass. 01720

[21] Appl. No.: 189,168

[22] Filed: Jan. 31, 1994

Related U.S. Application Data

[63] Continuation of Ser. No. 12,048, Feb. 2, 1993, Pat. No. 5,283,384, which is a continuation-in-part of Ser. No. 807,155, Dec. 13, 1991, abandoned.

[51] Int. Cl.$^6$ .............................................. G02B 6/10
[52] U.S. Cl. ................................................. 385/16
[58] Field of Search ....................... 385/15, 16, 17, 18; 359/108, 109, 241, 239

[56] References Cited

U.S. PATENT DOCUMENTS

| | | | |
|---|---|---|---|
| 3,448,282 | 6/1969 | Fleisher et al. | 250/255 |
| 3,637,287 | 1/1972 | Hansen | 350/147 |
| 3,849,740 | 11/1974 | Brandt | 331/94.5 C |
| 3,984,785 | 10/1976 | Riseberg et al. | 331/94.5 M |
| 4,128,300 | 12/1978 | Stotts et al. | 350/96.14 |
| 4,262,992 | 4/1981 | Berthold, III | 350/96.14 |
| 4,363,106 | 12/1982 | Tai | 346/746 |
| 4,376,285 | 3/1983 | Leonberger et al. | 357/17 |
| 4,632,518 | 12/1986 | Jensen | 350/385 |
| 4,674,828 | 6/1987 | Takahashi et al. | 350/96.13 |
| 4,689,793 | 8/1987 | Liu et al. | 372/8 |
| 4,707,081 | 11/1987 | Mir | 350/388 |
| 4,761,060 | 8/1988 | Sawano | 350/354 |
| 4,786,128 | 11/1988 | Birnbach | 350/96.14 |
| 4,811,258 | 3/1989 | Andersen et al. | 364/713 |
| 4,863,247 | 9/1989 | Lasher et al. | 350/401 |
| 4,867,515 | 9/1989 | Normandin | 350/96.13 |
| 4,875,181 | 10/1989 | Hagemeyer | 364/716 |
| 4,900,115 | 2/1990 | Heuring et al. | 350/96.15 |
| 4,910,737 | 3/1990 | Payne et al. | 372/6 |
| 4,915,486 | 4/1990 | Hansen | 350/171 |
| 4,922,497 | 5/1990 | Mori et al. | 372/8 |
| 4,926,366 | 5/1990 | Cuykendall et al. | 364/713 |
| 4,932,739 | 6/1990 | Islam | 350/96.15 |

OTHER PUBLICATIONS

Hinton, H. S., Architectural Consideration ... Networks, IEEE J. on Sel. Areas in Comm., vol. 6, No. 7, pp. 1209–1226 Aug. 1988.
Schmidt, R. V. et al, Optically Induced Crosstalk in LiNbO3 Waveguide Switches, J. Appl. Phys., vol. 51, No. 1, pp. 90–93, Jan. 1980.
Alferness, R. C., Ent Waveguide Electro-Optic ..., Appl. Phys. Lett., vol. 36, No. 7, pp. 513–515, Apr. 1980.
Alferness, R. C. et al, High Speed Waveguide Electro-Optic Polarization Modulator, Optics Letter, vol. 7, No. 10, pp. 500–502, Oct. 1982.
Thaniyavarn, S., Wavelength–Independent, Optical–Damage–Immune ... Optics Letters, vol. 11, No. 1, pp. 39–41, Jan. 1986.
Sanford, N. A. et al, Direct–Current Bias Stable ..., Optics Letters, vol. 12, No. 7, pp. 531–533, Jul. 1987.
Lam, J. F. et al, Dynamics of Optical ..., Appl. Phys. Lett., vol. 45, No. 11, pp. 1172–1174, Dec. 1984.

(List continued on next page.)

*Primary Examiner*—Akm E. Ullah
*Attorney, Agent, or Firm*—Wolf, Greenfield & Sacks

[57] ABSTRACT

In a first feature of the invention, an optical switching element is a semi-transparent, metallic film having variable absorption and transmission depending upon whether one or two optical signals are present. The metallic film can be illuminated from opposite sides in a direction perpendicular to its plane by two optical signals or can be illuminated obliquely at the same angle of incidence from opposite sides by two optical signals. In another embodiment, the metallic film is located between two optical waveguides. In a second feature of The invention, an optical switching element is an optically active material that rotates the plane of polarization of an optical input signal in the absence of an optical control signal and rotates the plane of polarization of the optical input signal to a lesser degree in response to an optical control signal. The optical input signal and the optical control signal have $\pi$ radians phase difference in the optical waveguide and have the same plane of polarization.

49 Claims, 7 Drawing Sheets

OTHER PUBLICATIONS

Sanford, N. A. et al, Simplified Z-Propagating DC Bias . . . , IEEE J. of Lightwave Tech., vol. 6, No. 6, pp. 898–901, Jun. 1988.

Becker, R. A., Methods of Char. Photorefractive . . . , SPIE., vol. 578, Integ. Optical Cir. Eng. II, pp. 12–18, 1985.

Glass, A. M., The Photorefractive Effect, Optical Engineering, vol. 17, No. 5, pp. 470–479, Sep.–Oct. 1978.

Sanford, N. A., Optical Damage Effects in Z-Propagating . . . , SPIE, vol. 704, pp. 58–61 Integ. Optical Cir. Engl. IV, 1986.

McCarroll, T., "Harnessing the Speed of Light", Time, Feb. 12, 1990, p. 71.

OPTICAL SWITCHES

This application is a continuation of application Ser. No. 08/012,048 filed Feb. 2, 1993, now U.S. Ser. No. 5,283,843 which is a continuation-in-part of application Ser. No. 07/807,155 filed Dec. 13, 1991, abandoned.

FIELD OF THE INVENTION

This invention relates to components for an optical computer and, more particularly, to optical switches and logic gates for optical computers.

BACKGROUND OF THE INVENTION

Optical switching devices, logic elements and other computer components have been the subject of research because of the desirability of optical systems in many circumstances. Optical computer systems offer the advantages of high operating speeds, immunity to electrical noise and lower power requirements. Such systems can be entirely optical, wherein all data and control signals are in optical form without conversion to electronic signals. A general discussion of optical switching networks is given by Hinton in "Architectural Considerations for Photonic Switching Networks", *IEEE Journal on Selected Areas in Communications*, Vol. 6, No. 7, August 1988, pages 1209–1226.

U.S. Pat. No. 4,863,247, issued Sep. 5, 1989 to Lasher et al, discloses trinary optical logic systems using an optical three-state polarization scheme.

U.S. Pat. No. 4,811,258, issued Mar. 7, 1989 to Andersen et al, discloses an optical logic gate using nonlinear reflection and refraction at an interface.

U.S. Pat. No. 4,926,366, issued May 15, 1990 to Cuykendall et al, discloses thin film optical computing circuits including a thin film half adder, a full adder and a carry-propagate adder.

U.S. Pat. No. 4,761,060, issued Aug. 2, 1988 to Sawano, discloses an optical D-type flipflop that uses an optical switch and an optical bistable element.

U.S. Pat. No. 4,922,497, issued May 1, 1990 to Mori et al, discloses an optical logic circuit using a semiconductor laser.

U.S. Pat. No. 4,910,737, issued Mar. 20, 1990 to Payne et al, discloses a bistable optical fiber device that can be used for logic memory and regenerative amplification applications.

U.S. Pat. No. 4,900,115, issued Feb. 13, 1990 to Heuring et al, discloses optical logic circuits including a lithium niobate switch and an optical fiber loop as a delay line memory.

U.S. Pat. No. 4,875,181, issued Oct. 17, 1989 to Hagemeyer, discloses a device for performing logical operations wherein the plane of polarization of linearly polarized light is distorted by electric or magnetic fields.

U.S. Pat. No. 4,786,128, issued Nov. 22, 1988 to Birnbach, discloses a multilayer device for modulating and reflecting light, comprising an electro-optic layer with a variable index of refraction. The device can be used as an optical logic element.

U.S. Pat. No. 4,707,081, issued Nov. 17, 1987 to Mir, discloses a linear light valve array having discretely addressable electro-optic gates for selectively changing the polarization of incident polarized light.

U.S. Pat. No. 4,689,793, issued Aug. 25, 1987 to Liu et al, discloses optical logic gates and circuits based direct polarization switching in a semiconductor laser.

U.S. Pat. No. 4,632,518, issued Dec. 30, 1986 to Jensen, discloses a nonlinear optical logic device in which two input light beams having independent modes are launched. The device operates independently of the relative phases of the two inputs.

U.S. Pat. No. 4,262,992, issued Apr. 21, 1981 to Berthold III, discloses an integrated optical logic element formed on a substrate of electro-optic material, capable of being controlled to perform different logic operations.

U.S. Pat. No. 4,128,300, issued Dec. 5, 1978 to Stotts et al, discloses a generalized optical logic element capable of simultaneously performing different logic functions.

U.S. Pat. No. 3,984,785, issued Oct. 5, 1976 to Riseberg et al, discloses an optical logic device which includes a laser resonator which in turn includes means for producing an optical laser output having a direction of polarization along selectable directions.

U.S. Pat. No. 3,849,740, issued Nov. 19, 1974 to Brandt, discloses an integrated thin film logic gate including two input waveguides to a laser active film and one waveguide output from the laser active film.

U.S. Pat. No. 3,637,287, issued Jan. 25, 1972 to Hansen, discloses techniques for reducing the opening time of optical gates employing a gate medium in which birefringence is optically induced.

U.S. Pat. No. 4,363,106, issued Dec. 7, 1982 to Tai, discloses a computation module for an optical computer based on the residue number system.

U.S. Pat. No. 3,448,282, issued Jun. 3, 1969 to Fleisher et al, discloses an optical AND gate employing linearly polarized light and a tube having a photocathode.

U.S. Pat. No. 4,932,739, issued Jun. 12, 1990 to Islam, discloses optical logic devices which utilize soliron trapping between two optical signals propagating in a birefringent fiber.

U.S. Pat. No. 4,867,515, issued Sep. 19, 1989 to Normandin, discloses an optical modulator which utilizes a channel waveguide and an optical control signal.

All of the known prior art optical switching components have had serious disadvantages, including relatively slow switching speeds, high power requirements, and the like.

It is a general object of the present invention to provide novel optical switches.

It is another object of the present invention to provide apparatus for performing binary arithmetic operations using optical signals.

It is a further object of the present invention to provide optical switching components which require low power.

It is a further object of the present invention to provide optical switching components based o$_n$ controlled transmittance of light through a semi-transparent metallic film.

It is a further object of the present invention to provide optical switching components based on controlled rotation of the plane of polarization of an input optical signal by an optically active substance.

SUMMARY OF THE INVENTION

According to the present invention, these and other objects and advantages are achieved in optical switches and optical logic gates.

According to one aspect of the invention, the controlled optical element is a semi-transparent metallic film having variable absorption and transmission depending on whether one or two optical signals are present. In a first embodiment of the invention, the semi-transparent metallic film is illuminated from opposite sides in a direction perpendicular to its plane by two optical signals. In a second embodiment, the semi-transparent metallic film is illuminated obliquely at the same angle of incidence from opposite sides by two optical signals. In a third embodiment, the semi-transparent metallic film is located between two parallel optical waveguides. Two or more semi-transparent metallic films separated by a multiple of one-half the wavelength of the optical signal can be used to distribute the amount of light energy absorbed and thereby prevent overheating of an individual film.

According to another aspect of the invention, optical switching apparatus comprises an optical waveguide fabricated of a material that rotates the plane polarization of an optical input signal transmitted therethrough in the absence of an optical control signal and rotates the plane of polarization of the optical input signal to a lesser degree in response to an optical control signal. The switching apparatus includes means for conveying the optical input signal and the optical control signal to the optical waveguide, means for combining the optical input signal and the optical control signal in the optical waveguide such that the signals have $\pi$ radians phase difference in the optical waveguide, and means for conveying from the optical waveguide an optical output signal having a plane of polarization that is controlled by the presence or absence of the optical control signal. The optical waveguide is preferably fabricated of an optically active material that has a dissymmetric molecular structure.

Preferably, the optical input signal has a first plane of polarization to indicate a first logic state and a second plane of polarization to indicate a second logic state. The optical control signal has the same plane of polarization as the optical input signal. The first plane of polarization typically differs from the second plane of polarization by $\pi/2$ radians.

In a first embodiment of the optical switching apparatus, the optical input signal and the optical control signal are conveyed to the waveguide on optical paths that intersect at an angle of 90°. The means for combining the optical input signal and the optical control signal comprises a linear phase retarder in the optical path of the optical control signal. The waveguide has a length along the optical path of the optical input signal that is sufficient for the plane of polarization of the optical input signal to be rotated by $\pi/2$ radians when the optical control signal is not present. The waveguide has a width along the optical path of the optical control signal that is less than 1/5th the wavelength of the optical control signal.

In a second embodiment of the optical switching apparatus, the optical input signal and the optical control signal are conveyed to the waveguide on optical paths that intersect at an angle typically greater than 150°. The means for combining the optical input signal and the optical control signal comprises the waveguide having a thickness less than 1/5th the wavelength of the optical signals and the waveguide being located between a first reflecting surface and a second reflecting surface. The reflecting surfaces are parallel with one another and are separated by a distance such that the optical path length of the optical signals reflected from the first surface through the waveguide and to the second surface is a multiple of ¼th the wavelength of the optical signals. The waveguide has a length sufficient for multiple reflections of the optical signals between the first and second reflecting surfaces.

An optical AND gate for processing an A optical signal and a B optical signal comprises an optical waveguide fabricated of a material that rotates the plane of polarization of an optical input signal transmitted therethrough in the absence of an optical control signal and rotates the plane of polarization of the optical input signal to a lesser degree in response to an optical control signal. The optical waveguide has an optical input, a control input and an output. The optical AND gate further comprises means for conveying the A optical signal to the optical input of the waveguide, means for conveying the B optical signal to the control input of the waveguide, means for combining the A optical signal and the B optical signal in the waveguide such that the signals have $\pi$ radians phase difference in the waveguide, and means coupled to the output of the optical waveguide for separating an optical output signal at the output of the waveguide into orthogonal planes of polarization and for conveying the optical output signal having a first plane of polarization to provide an output of the optical AND gate.

According to a further aspect of the invention, optical switching apparatus comprises a switching element fabricated of a film that absorbs a portion of incident light, transmits a portion of incident light and reflects a portion of incident light, means for generating an optical input signal, means for generating an optical control signal of the same wavelength and intensity as the optical input signal, a waveguide for conveying the optical input signal and the optical control signal on anti-parallel paths such that the switching element is illuminated from both sides, means for positioning a node of a resultant standing wave at the midpoint of the switching element when the element is illuminated simultaneously by the optical input signal and the optical control signal, means for combining an offset transmission optical signal with the portion of incident light that is transmitted through the switching element in the absence of the standing wave such that the offset transmission optical signal destructively interferes with the portion of incident light that is transmitted through the switching element, means for combining an offset reflection optical signal with the portion of incident light that is reflected from the switching element in the absence of the standing wave such that the offset reflection optical signal destructively interferes with the portion of incident light that is reflected by the switching element, and a waveguide for conveying incremental optical signals that have been transmitted through the switching element in the presence of the standing wave as an optical output signal.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

According to a first aspect of the invention, the controlling optical element is a semi-transparent metallic film having variable absorption and transmission depending on whether one or two optical signals are present. In a first embodiment of the invention, the metallic film is illuminated from opposite sides in a direction perpendicular to its plane by two optical signals. In a second embodiment, the metallic film is illuminated obliquely from opposite sides by two optical signals. In a third embodiment, the metallic film is located between two parallel optical waveguides. This aspect of the invention is described in detail below.

The operation of the switches described herein is dependent on maintenance of precise optical relationships between optical signals used in the binary computation. The intensities of bitstream optical signals and control signals must be equal. This requires that the sources be equal in output intensity and that the losses in equivalent length waveguides be equal. The plane of polarization of signals is critical in gates using switchable half wave plates. This requires that the waveguides used to convey polarized optical signals maintain the plane of polarization. The phase relationships between bitstream signals are critical in gates using semi-transparent metallic films. This requires that optical path lengths for two mutually dependent signals be equal and that waveguides carrying mutually dependent optical signals share a common environment, particularly temperature. Prior art techniques for accomplishing the above are well known to those skilled in the art and are not specifically described herein.

In accordance with the first aspect of the invention, an optical AND gate is based on variable absorption of light in a semi-transparent metallic film. The effect is produced by the presence of two light waves in the film. This phenomenon is described mathematically as follows.

Two waves of the same period and intensity traveling in opposite directions produce a stationary standing wave. This is shown mathematically as:

Wave left to right: $A \cos(\omega t - kx)$
Wave right to left: $A \cos(\omega t + kx)$
Combining both waves: $a(\text{resultant}) = A \cos(\omega t - kx) \cos(kx)$
Simplifying: $a = 2A \cos(\omega t) \cos(kx)$ The result is a cosinusoidal waveform with an amplitude varying from $+2A$ to $-2A$. The regions where the amplitude is zero are nodes, which are one-half wavelength apart. Similarly, the regions of maximum amplitude are anti-nodes and are one-half wavelength apart. The amplitudes and their positions are fixed in space. Thus, the region of a node has a zero rate of change in amplitude.

The index of refraction of a semi-transparent metallic film is a function of the metal and the frequency of light.

$$n^2 = 1 + (\sigma/\epsilon_0)/(i\omega(1 + i\omega\tau))$$

where $$\tau = m\sigma/Nq_e^2$$

where $\sigma$ is conductivity, $\epsilon_0$ is the dielectric constant, $\omega$ is the frequency of the light wave, m is the mass of an electron, N is the number of electrons "free" for conduction, and $q_e$ is the electric charge of an electron.

The propagation of the electric field of a light wave in metal can be described as:

$$E_x = E_0 e^{-i\omega(t - nz/c)}$$

where the index of refraction $n = n_R - n_I$, representing a real term and an imaginary term. The wave has a cyclical waveform as expressed by $e^{i\omega(t - n_R x/c)}$ traveling with a speed of $c/n_R$. The amplitude of the electric field of the light wave decays exponentially with z as expressed by $e^{-\omega n_I z/c}$. The energy that is absorbed in the film is a function of the interaction between the real term and the imaginary term of the index.

However, with a standing wave, the amplitude and the change in amplitude with respect to time of the electric field at the region of a node is always zero because the wave is stationary. Therefore, at the region of a node, the decay is zero, or nearly zero. Thus, light in a single wave is partially absorbed in a semi-transparent metal film, but light in two waves that create a standing wave with a node at the mid-plane of the film is not absorbed in the region of a node. If the thickness of the metal film is a fraction of the wavelength, such as 1/25th of the wavelength or less, the effect of the region of a node is very significant relative to the path length of light waves in the film, and the amount of light in a standing wave that is not absorbed is, likewise, significant. This effect is exploited to perform the logic function of an AND gate.

Absorption is the mechanism that is fundamental to the operation of gates made with semi-transparent films that have real and imaginary components of the index of refraction. The material used must be selected to provide the appropriate absorption, given the wavelength of light to be used in the system. Generally, this is indicated by the magnitudes of the real and imaginary components of the index of refraction, which should be large, for example two or more, and nearly equal. The class of materials that is most typically suited is metals, although other kinds of materials could be used. Candidate metals with satisfactory optical properties in the visible and near infrared range are: antimony, beryllium, chromium, cobalt, iron, molybdenum, nickel, niobium, palladium, platinum, rhenium, tantalum, titanium, and tungsten. Special alloys can also be designed for this application. The above list does not take into account differences in degree of ease of fabrication, avoidance of contamination or oxidation, or cost.

Despite the above mathematical analysis, it should be understood that there are several second order photon/electron effects that cannot be accounted for in the mathematical model so that the actual results may vary by as much as five to ten percent from the predicted values.

The intensity of reflection of light from a metallic surface depends on the angle of incidence and the direction of polarization. For light with the electric field perpendicular to the plane of incidence, the reflection coefficient is $$R_{perp} = (\sin^2(q_i - q_t))/(\sin^2(q_i + q_t))$$

For light with the electric field parallel to the plane of incidence, the reflection coefficient is $$R_{par} = (\tan^2(q_i - q^t))/(\tan^2(q_i + q_t))$$

where i is the angle of incidence and t is the angle of transmittance in the metal, which is a function of the index of refraction. It is important that the illuminating light wave be either parallel or perpendicular. Otherwise the reflected wave will be elliptically polarized.

For normal incidence, the reflection coefficient is $$R = ((n_i - n_t)/(n_i + n_t))^2$$

As described below, the operation of an optical AND gate utilizing a semi-transparent metallic film requires either a null output with either one or no inputs, or else an output with two inputs. Consequently, it is advantageous to have the amount of light transmitted with one signal nearly equal the amount of light reflected. This is accomplished by selecting the appropriate combination of metal used, wavelength of light in the optical signal, thickness of the film, angle of incidence of the light waves on the film, and the plane of polarization.

Selective absorption of light in a semi-transparent metallic film is based on two waves being incident from opposite sides on the film such that a stationary standing wave is generated in the film with a node of the standing wave being positioned at the mid-plane of the film. Because of the attenuation of the waves in the film, the thickness of the film must be significantly less than the wavelength of the light wave. Typically, the metallic film has a thickness in a range of about 0.01 to 0.1 times the wavelength of the input light waves. Four configurations of an AND gate utilizing this approach are described below.

Two alternative configurations for an AND gate, which are described below, are based on two waves being incident from opposite sides, one wave being $\pi$ radians out of phase with respect to the other. In this case, too, the amplitude and the change in amplitude with respect to time of the electric field is zero. Therefore, the light absorbed is zero, or nearly zero. The combination of the outputs of an A·B' AND gate and an A'·B AND gate is a logical equivalent of an EXCLUSIVE OR gate. An EXCLUSIVE 0R gate and an A·B AND gate are required to implement a full adder.

Figure 1:
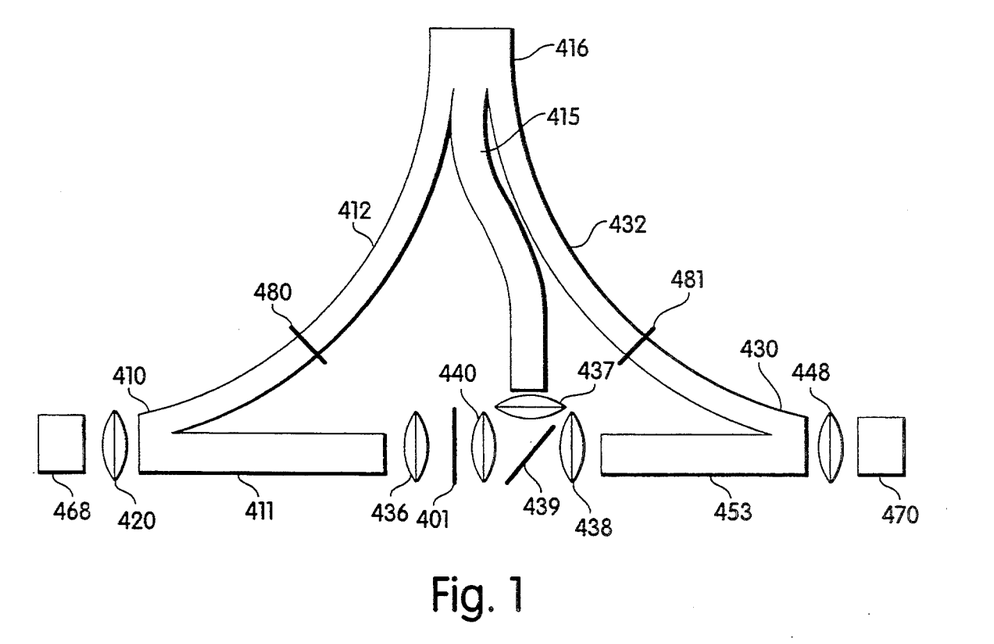
FIGS. 1 and 2 illustrate optical AND gates employing a semi-transparent metallic film as the switching medium, with normal light wave incidence on the metallic film.

An implementation of an optical AND gate utilizing a semi-transparent metallic film and perpendicular illumination is illustrated in FIG. 1. The gate can be fabricated on an integrated optical chip or with fiber optic waveguide. A supporting structure for the film is not shown. There is an exact optical correspondence between waveguides 410 and 430, between waveguides 411 and 453, and between waveguides 412 and 432. Waveguides 412 and 432 are joined with waveguide 415 into a single output waveguide 416. Waveguides 412 and 411 are joined into a first input waveguide 410o Waveguides 432 and 453 are joined into a second input waveguide 430.

Two coherent light sources 460 and 470 represent the optical signals to be ANDed, source 460 for the input and source 470 for the control. Focusing means 420 directs light from source 460 to input waveguide 410. Likewise, focusing means 448 directs light from source 470 into input waveguide 430. Focusing means 436 directs light from waveguide 411 to a spot on metallic film 401. Focusing means 438 directs light from waveguide 453 to beam splitter 439. Focusing means 437 directs light from beam splitter 439 to waveguide 415. Focusing means 440 directs light from beam splitter 439 to a spot on metallic film 401. Half wave plate 480 retards compensatory light in waveguide 412 so that its phase is $\pi$ radians out of phase with respect to light transmitted through film 401 and emanating from source 460. Half wave plate 481 retards compensatory light in waveguide 432 so that its phase is $\pi$ radians out of phase with respect to light reflected from film 401 and emanating from source 470. Beam splitter 439 passes half of the incident light and redirects the remaining half of the incident light.

Light emitted from source 460 is directed to waveguide 410 where the light is split between waveguides 412 and 411. Waveguides 411 and 412 are proportioned such that the appropriate amount of compensatory light is conveyed on waveguide 412. Some of the light in waveguide 411, a proportion R, is reflected from metallic film 401. Half of the light that is transmitted through the film 401 is directed to waveguide 415 by beam splitter 439, and the remaining half passes through beam splitter 439 to waveguide 453, where it is of no consequence to the system.

Compensatory light is conveyed by waveguide 410 to waveguide 412 and then to output waveguide 416. The amount of compensatory light is equal to the light that is transmitted through the film 401 when source 470 is quiescent, and is directed by beam splitter 439 to waveguide 415.

With no simultaneous signal from source 470, a portion of the light not reflected from thin film 401 is absorbed in the film. When the film 401 is illuminated from both sides, such that a node of a standing wave is positioned at the central axis of the film, the light that had been absorbed in the case of illumination from a single source is now transmitted through the film. Half of the transmitted light is directed by beam splitter 439 to waveguide 415, and the remaining half passes through beam splitter 439 to waveguide 453, where it is of no consequence to the system.

The process with light from source 470 is quite similar, given the near symmetry of the gate. Light emitted from source 470 is directed to waveguide 430 where the light is split between waveguides 430 and 453. Waveguides 430 and 453 are proportioned such that the appropriate amount of light is conveyed on waveguide 432. Beam splitter 439 passes half of the light from waveguide 453 through focusing means 440 to a spot on film 401. The amount of light directed to the spot must be the same as the amount of light that is directed to the film from source 460. Some of the light, a proportion R, is reflected from metallic film 401 with its phase changed by $\pi$ radians, or nearly so. Half of the reflected light is directed to waveguide 415 by beam splitter 439.

Compensatory light is conveyed by waveguide 430 to waveguide 432 and then to output waveguide 416. Half wave plate 481 in the optical path in waveguide 432 retards compensatory light so that its phase is exactly $\pi$ radians out of phase with respect to the light reflected from film 401 and emanating from source 470. The amount of compensatory light is equal to the light that is directed to waveguide 415, i.e., half the amount that is reflected from film 401. Thus, the compensatory light destructively interferes with the reflected light to produce a null output signal when there is no simultaneous signal from the input side.

With simultaneous signals from the input side and the control side, the amount of light that was absorbed in the film with only one signal present is transmitted. The incremental signal is the only output. With this configuration, the incremental signal is the light from source 460 that was absorbed but is now transmitted.

Figure 2:
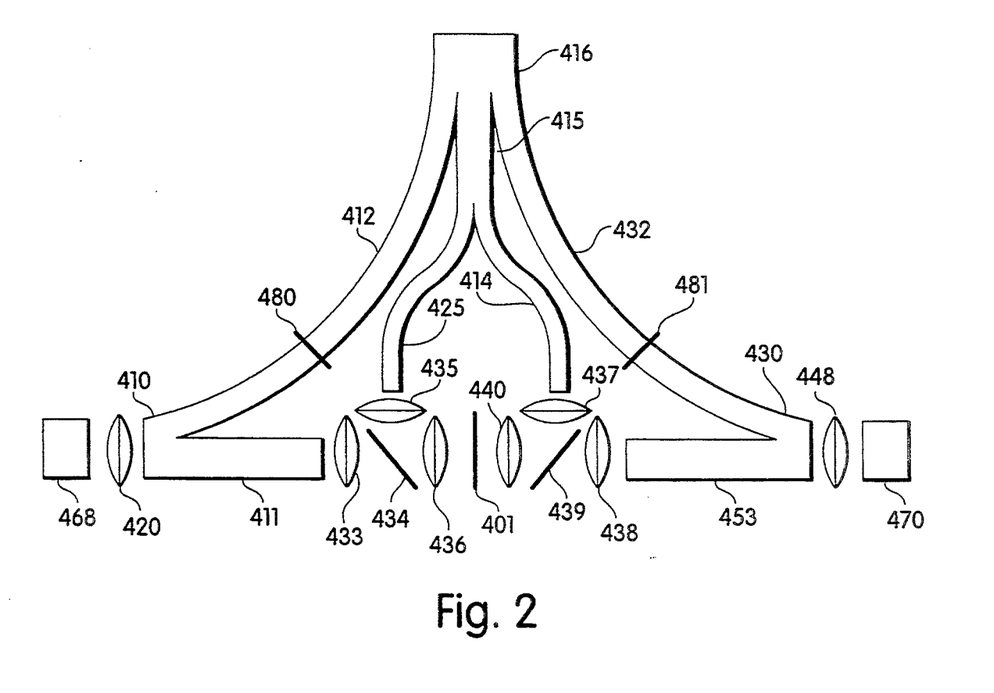

An implementation of an optical AND gate utilizing a semi-transparent metallic film and perpendicular illumination is illustrated in FIG. 2. The gate can be fabricated on an integrated optical chip or with fiber optic waveguide. Like elements in FIGS. 1 and 2 have the same reference numerals. The gate shown in FIG. 2 is perfectly symmetrical about a plane coincident with thin metallic film 401. A supporting structure for the film is not shown. There is an exact optical correspondence between waveguides 410 and 430, between waveguides 411 and 453, between waveguides 425 and 414, and between waveguides 412 and 432. Waveguides 425 and 414 are joined into a single waveguide 415. Waveguides 412 and 432 are joined with waveguide 415 into a single output waveguide 416. Waveguides 412 and 411 are joined into a first input waveguide 410. Waveguides 432 and 453 are joined into a second input waveguide 430.

Two coherent light sources 460 and 470 represent the optical signals to be ANDed. Focusing means 420 directs light from source 460 to input waveguide 410. Likewise, focusing means 448 directs light from source 470 into input waveguide 430. Focusing means 433 directs light from waveguide 411 to beam splitter 434. Focusing means 435 directs light from beam splitter 434 to waveguide 425. Focusing means 436 directs light from beam splitter 434 to a spot on metallic film 401. Focusing means 438 directs light from waveguide 453 to beam splitter 439. Focusing means 437 directs light from beam splitter 439 to waveguide 414. Focusing means 440 directs light from beam splitter 439 to a spot on metallic film 401. Half wave plate 480 retards compensatory light in waveguide 412 by $\pi$ radians with respect to light conveyed on waveguides 425 and 414 when source 470 is quiescent. Half wave plate 481 retards compensatory light in waveguide 432 by $\pi$ radians with respect to light conveyed on waveguides 414 and 425 when source 460 is quiescent. Beam splitters 434 and 439 pass half of the incident light and redirect the remaining half of the incident light.

Light emitted from source 460 is directed to waveguide 410 where the light is split between waveguides 412 and 411. Waveguides 411 and 412 are proportioned such that the appropriate amount of compensatory light is conveyed on waveguide 412. Some of the light in waveguide 411 is directed away from the film 401 by beam splitter 434. Of the light passing through beam splitter 434, a proportion R is reflected from metallic film 401. Of the reflected proportion R, half is directed to waveguide 425 by beam splitter 434 and the other half passes through beam splitter 434 to waveguide 411, where it is of no consequence to the system. Half of the light not reflected by thin film 401 is transmitted through the film and is directed to waveguide 414 by beam splitter 439, and the remaining half passes through beam splitter 439 to waveguide 453, where it is of no consequence to the system.

Compensatory light is conveyed by waveguide 410 to waveguide 412 and then to output waveguide 416. The amount of compensatory light is equal to the light that is refracted from the film 401 and directed by the beam splitter 434 to waveguide 425 plus the light that is transmitted through the film 401 when source 470 is quiescent, and is directed by beam splitter 439 to waveguide 414.

With no simultaneous signal from source 470, a portion of the light not reflected from thin film 401 is absorbed in the film. When the film 401 is illuminated from both sides, such that a stationary standing wave is generated with a node positioned at the central axis of the film, the light that had been absorbed in the case of illumination from a single source is now transmitted through the film. Half of the transmitted light is directed by beam splitter 439 to waveguide 414 and the remaining half passes through beam splitter 439 to waveguide 453, where it is of no consequence to the system.

Because of symmetry, the same process and corresponding paths apply to signals emitted from source 470.

With simultaneous signals from the input side and the control side, the amount of light that was absorbed in the film 401 with only one signal present is transmitted. The incremental signal is the only output. With this configuration, the incremental signal is the light from both sources 460 and 470 that was absorbed but is now transmitted.

Figure 3:
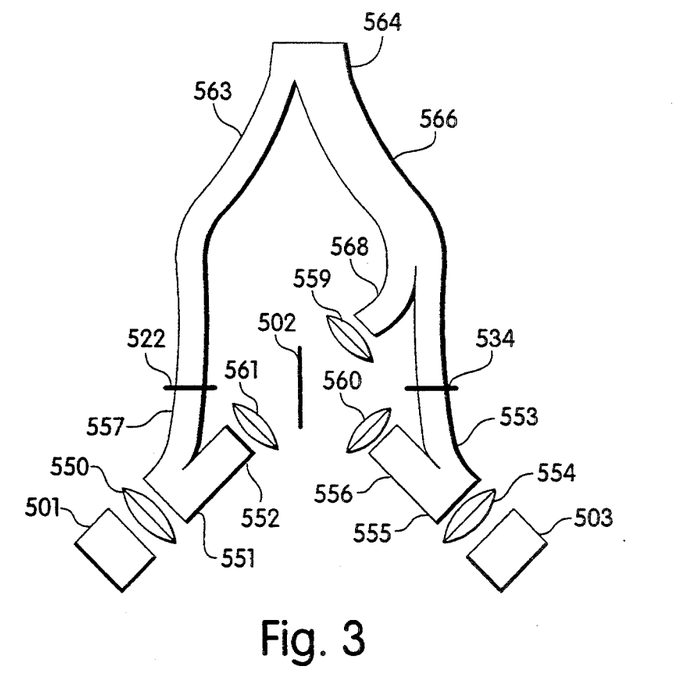
FIGS. 3 and 4 illustrate alternative optical AND gates employing a semi-transparent metallic film as the switching medium, with oblique light wave incidence on the metallic film.

An implementation of an AND gate utilizing a semi-transparent metallic film and oblique illumination is illustrated in FIG. 3. The gate can be fabricated on an integrated optical chip or with fiber optic waveguide. There is an exact optical correspondence between waveguides 551 and 555, between waveguides 552 and 556, and between waveguides 557 and 553. Waveguides 563 and 566 are joined into a single output waveguide 564. Waveguides 552 and 557 are joined into a first input waveguide 551. Waveguides 556 and 553 are joined into a second input waveguide 555.

Two coherent light sources 501 and 503 represent the optical signals to be ANDed. Focusing means 554 directs light from source 503 to input waveguide 555. Focusing means 560 directs light from waveguide 556 to a spot on semi-transparent film 502. A proportion R of the incident light is reflected and directed by focusing means 559 to waveguide 568 and then to waveguide 566 and to output waveguide 564.

Compensatory light is conveyed by waveguide 553 to half wave plate 534 where the light is retarded such that its phase is $\pi$ radians out of phase with respect to the light that is reflected from film 502 and directed to waveguide 568. The amount of compensatory light is equal to the amount of light that is reflected from film 502 and directed to waveguide 568. Thus, the compensatory light destructively interferes with the reflected light and cancels it.

Focusing means 550 directs light from source 501 to input waveguide 551. Focusing means 561 directs light from waveguide 552 to a spot on semi-transparent film 502. A proportion of the light is transmitted through the film and directed by focusing means 559 to waveguide 568 and then to waveguide 566 and then to waveguide 564.

Compensatory light is conveyed by waveguide 557 to half wave plate 522 where the light is retarded such that its phase is $\pi$ radians out of phase with respect to the light that is transmitted through film 502 and directed to waveguide 568. The amount of compensatory light is equal to the amount of light that is transmitted through the film 502 when the source 503 is quiescent. Thus, the compensatory light destructively interferes with the transmitted light and creates a null condition when source 501 is operating and source 503 is quiescent.

The switching mechanism of the gate is achieved by the effect caused by illuminating the semi-transparent film with light from both sides simultaneously such that a standing wave is created in the film. The effect is that the light energy that had been absorbed in the case of illumination from a single source is transmitted through the film with signals from both sides.

Thus, when neither source is present, the output is null and when only one source is present, the output is likewise null due to the cancelling process described above. However, when both sources are present, the output is the amount of energy that is absorbed by the film with only one signal present.

Figure 4:
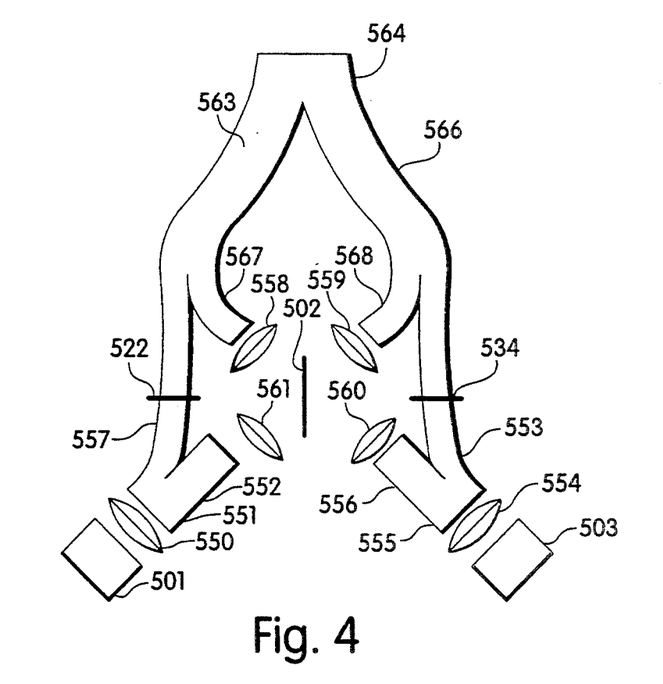

An implementation of an AND gate utilizing a semi-transparent metallic film and oblique illumination is illustrated in FIG. 4. The gate can be fabricated on an integrated optical chip or with fiber optic waveguide. Like elements in FIGS. 3 and 4 have the same reference numerals. The gate is perfectly symmetrical about a plane coincident with semi-transparent metallic film 502. A supporting structure for the film is not shown. There is an exact optical correspondence between waveguides 551 and 555, between waveguides 552 and 556, between waveguides 557 and 553, between waveguides 567 and 568, and between waveguides 563 and 566. Waveguides 563 and 566 are joined into a single output waveguide 564. Waveguides 552 and 557 are joined into a first input waveguide 551. Waveguides 556 and 553 are joined into a second input waveguide 555.

Two coherent light sources 501 and 503 represent the optical signals to be ANDed. Focusing means 550 directs light from source 501 to input waveguide 551. Likewise, focusing means 554 directs light from source 503 to input waveguide 555. Focusing means 560 directs light from waveguide 556 to a spot on thin film 502. A proportion R of the incident light is reflected and directed by focusing means 559 to waveguide 568 and then to waveguide 566 and to waveguide 564. Of the light not reflected by film 502, a proportion A is absorbed in the film and a proportion T is transmitted through the film and directed by focusing means 558 to waveguide 567 and then to waveguide 563 and to waveguide 564. Half wave plate 534 in optical path 553 alters the phase of compensatory light such that it is $\pi$ radians out of phase with the sum of the light transmitted and reflected when source 501 is quiescent. Waveguides 556 and 553 are proportioned such that signal light is conveyed by waveguide 556 and compensatory light with appropriate magnitude is conveyed by waveguide 553 and destructively interferes with the reflected light and transmitted light conveyed on waveguides 568 and 567, respectively.

Because of symmetry, the same process and corresponding paths apply to signals emitted from source 501.

The switching mechanism of the gate is achieved by the effect caused by illuminating the semi-transparent film with light from both sides simultaneously such that a standing wave is created in the film. The effect is that the light energy that had been absorbed in the case of illumination from a single source is transmitted through the film. The incremental light with this configuration is the light from both sources 501 and 503 that had been absorbed but is now transmitted.

Thus, when neither source is present, the output is null and when only one source is present, the output is likewise null due to the cancelling process with compensatory light. However, when both sources are present, the output is twice the amount of energy that was absorbed by the film with only one signal present.

Figure 5:
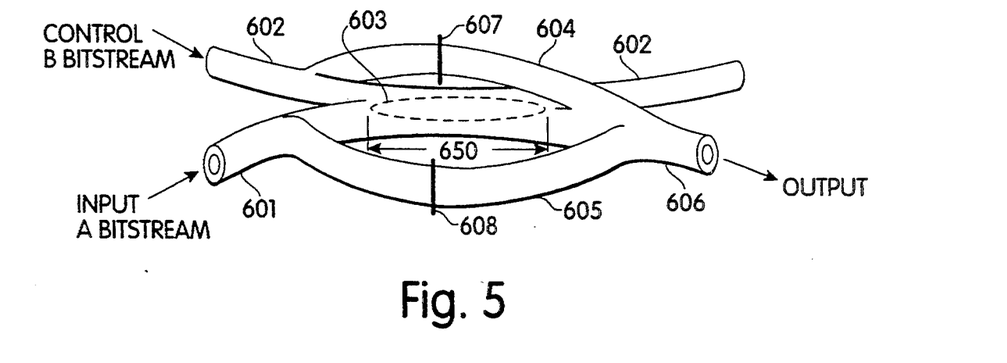
FIGS. 5, 6 and 7 illustrate embodiments of an optical AND gate employing a semi-transparent metallic film and fiber optic waveguides.
Figure 6:
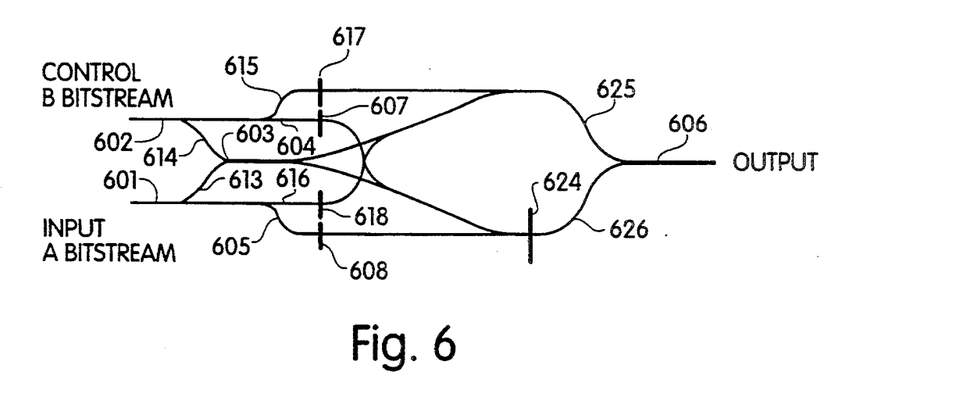
Figure 7:
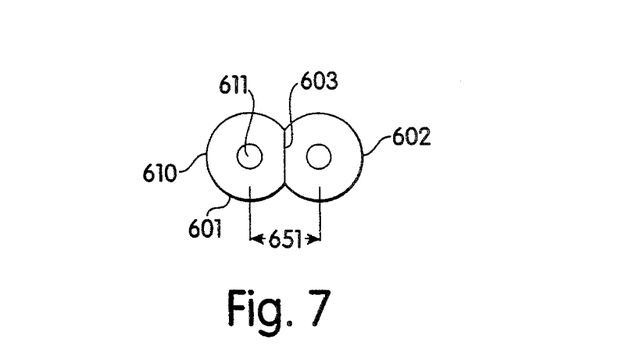

A third embodiment of an AND gate using semi-transparent metallic film absorption as a means for performing digital logic functions is shown in FIGS. 5, 6, and 7. Optical waveguides, such as an optical fiber 601 having a core 611 and cladding 610 and an optical fiber 602 with a similar core and cladding, are abutted against a thin metallic film 603, as best shown in FIG. 7. A portion of the cladding of each optical fiber 601 and 602 is removed as is known in the art of fiber optic couplers. The diameter of the core and cladding of each of the waveguides 601, 602 and the materials used in the waveguides are selected to facilitate transmission of the wavelength of the light signals used in the system. The metal used in the film 603, the length 650 of the metal film 603 and the distance 651 between cores are interdependent factors and are selected to absorb light as it is being conducted along optical waveguides 601 or 602. The candidate metals are listed above. The length of the film can range from 0.05 mm to 2 mm. The distance between the centers of the cores can range from ¼ to 3 times the core diameter. When light is present in one but not both of the waveguides, it is absorbed by the film 603. However, when both waveguides have a light signal with the same wavelength and a phase relationship with respect to each other such that the resulting electric field in the film is a stationary null wave, the amount of light absorbed by the film 603 is nearly zero. Thus, the configuration shown in FIG. 5 provides the function of an AND gate. Both A and B signals must be present to obtain an output. One signal or no signal provides a null output.

The operation of the gate is as follows. Optical signals in the A bitstream are $\pi$ radians out of phase with respect to B bitstream optical signals. Optical signals from the A bitstream are input to waveguide 601. A portion A is absorbed by film 603, a portion T is transmitted through the film 603 to waveguide 602 and a portion R is reflected and transmitted and merged into the output waveguide 606. However, it is necessary that the output signal be null when there is only an input from the A bitstream but no control signal from the B bitstream. Therefore, compensatory light equal in amount to the portion R is diverted to waveguide 605 and input to half wave plate 608, where it is retarded by $\pi$ radians with respect to the reflected A bitstream signals and merged into the output waveguide 606. The compensatory light destructively interferes with the light R, resulting in a null. The light T exits from waveguide 602, where it is of no consequence to the system. Optical signals from the B bitstream are input to waveguide 602. A portion A is absorbed by film 603, a portion T is transmitted through the film 603 to waveguide 601 and a portion R is reflected and transmitted and exits from the waveguide 602, where it is of no consequence to the system. However, it is necessary that the output signal be null if there is only a control signal from the B bitstream but no input signal from the A bitstream. Therefore, compensatory light equal in amount to the portion T is diverted to waveguide 604 and input to half wave plate 607, where it is retarded by $\pi$ radians with respect to the transmitted B bitstream signals and merged into the output waveguide 606. The compensatory light destructively interferes with the light T, resulting in a null. When both A and B signals are null, the output is null. When both A bitstream and B bitstream signals are present, the amount that was absorbed, A, is now transmitted. These outputs define the binary operation of an AND gate.

FIG. 6 is a schematic representation of another configuration of an AND gate utilizing a semi-transparent metallic film and parallel waveguides. Like elements in FIGS. 5 and 6 have the same reference numerals. Whereas the gate shown in FIG. 5 has an output of one signal, this configuration has an output of two signals. The operation of the gate is otherwise similar to the previously described gate. Bitstream A is input on waveguide 601, which branches to waveguides 613, 616 and 605. Bitstream B is input on waveguide 602, which branches to waveguides 614, 615 and 604. Optical signals in bitstream B have a $\pi$ radians phase difference with respect to optical signals in bitstream A. Bitstream A signals are conveyed to semi-transparent film 603 by waveguide 613, and bitstream B signals are conveyed to semi-transparent film 603 by waveguide 614.

A portion R of bitstream A signals is reflected from the film 603 back into waveguide 613, a portion T is transmitted through the film to waveguide 614 and a portion A is absorbed in the film. A portion R of bitstream B signals is reflected from the film 603 back into waveguide 614, a portion T is transmitted through the film to waveguide 613 and a portion A is absorbed in the film. As with the other embodiments, when the film is illuminated from both sides simultaneously, the light that was absorbed when only one signal was present is now transmitted.

Waveguide 616 is proportioned such that compensatory light conducted on it is equal in intensity to the light T transmitted through the film when bitstream B signals are not present. Half wave plate 618, which is in the optical path, retards the light so that it is $\pi$ radians out of phase with the transmitted light. Waveguide 616 merges with waveguide 614, and the compensatory light destructively interferes with the transmitted light T, creating a null.

Waveguide 605 is proportioned such that compensatory light conducted on it is equal in intensity to the light R reflected from the film. Half wave plate 608, which is in the optical path, retards the light so that it is $\pi$ radians out of phase with the reflected light. Waveguide 605 merges with waveguide 613, and the compensatory light destructively interferes with the reflected light R, creating a null.

When both A and B signals are present, the amount of light that was absorbed is now transmitted. However, since A and B have a $\pi$ radians phase difference, the output from one side must be retarded by $\pi$ radians. Half wave plate 624 performs this function. The output of the half wave plate 624 is conveyed on waveguide 626, which merges with waveguide 625 into output waveguide 606.

Waveguide 604 is proportioned such that compensatory light conducted on it is equal in intensity to the light T transmitted through the film 603 when A signals are not present. Half wave plate 607, which is in the optical path, retards the light so that it is $\pi$ radians out of phase with the transmitted light. Waveguide 604 merges with waveguide 613, and the compensatory light destructively interferes with the transmitted light T, creating a null.

Waveguide 615 is proportioned such that compensatory light conducted on it is equal in intensity to the light R reflected from the film 603. Half wave plate 617, which is in the optical path, retards the light so that it is $\pi$ radians out of phase with the reflected light. Waveguide 615 merges with waveguide 614 into waveguide 625, and the compensatory light destructively interferes with the reflected light R, creating a null. Waveguide 625 is merged into output waveguide 606.

In summary, with A signals and no B signals, the transmitted and reflected light is rendered to a null condition by compensatory signals that are $\pi$ radians out of phase. The same result is obtained with B signals and no A signals. With a null A input and a null B input, the output is null. With A and B signals, the output is the light that had been absorbed from both A and B signals. These four conditions define the boolean arithmetic for an AND gate. The systems described above use fiber optic waveguides. The system can also be implemented on integrated optical chips.

The thin metallic film gate configurations shown in FIGS. 1 and 2 and described above are based on a single film with anti-parallel light signals impinging on both sides and with a node of the resultant standing wave being positioned at the mid-point of the film. The amount of light absorbed and, consequently, the heat absorbed in the film with one signal present, is a function of the thickness. Too much heat can damage the film, i.e., cause it to evaporate.

Figure 8:
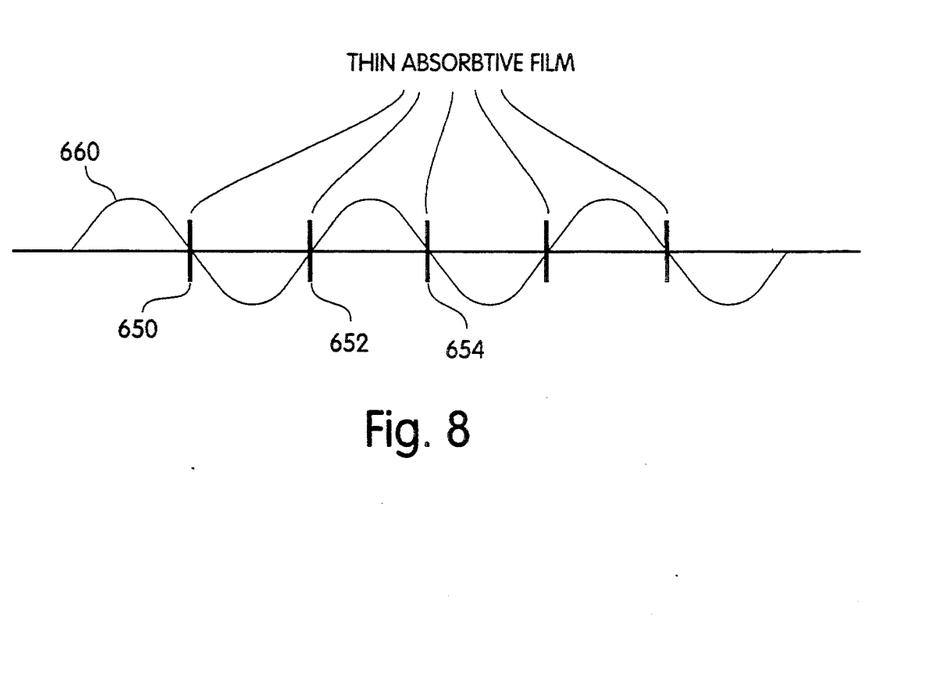
FIG. 8 shows the placement of several thin metallic films relative to an optical stationary standing wave.

FIG. 8 illustrates in schematic form a multi-film gate. The planes of films 650, 652, 654, etc., as with a single film gate, are perpendicular to the optical path. The films are separated by a non-absorbing, transparent material. The spaces between the films are exactly a multiple of one half of the wavelength of an optical signal 660. Thus, each film has a node at its midpoint and operates as a gate. The amount of light absorbed is thus spread over several films 650, 652, 654, etc. and the heat generated in each film is less.

According to a second aspect of the invention, an optical control signal is used to maintain the plane of polarization of an optical input signal in a dissymmetric material. The plane of polarization of the optical input signal otherwise would be rotated without the effect of the optical control signal. The plane of polarization indicates the logic state of the optical signal. In this example, a vertical plane of polarization is true, or logic state 1, and a horizontal plane of polarization is false, or logic state 0.

It is well known that the plane of linearly polarized light will be rotated by an optically-active medium if the refractive indices of the medium are different for right and left circularly polarized light. Circular birefringence is related to a circular dichroism, which is exhibited by all molecules that are not superposable on their mirror image and exist as laevo and dextro-rotatory isomers, as described by Mason in "Optical Activity and Molecular Dissymmetry", *Contemporary Physics*, Vol. 9, No. 3, pp. 239–256 (1968), Lowry in (citation) and others. The amount of rotation is determined by the molecular nature of the substance, the wavelength of the electromagnetic wave, and the optical path length. Hecht in *Optics*, Addison-Wesley, (1990), p. 313 describes a simple model of such an optically active substance with electrons constrained to move along twisting paths that are assumed to be helical. Jacobs in "Liquid Crystals For Laser Applications", *Handbook of Laser Science and Technology*, Vol. IV, Optical Materials, Part 2, CRC Press, (1986); deVries in "Rotary Power and Other Optical Properties of Certain Liquid Crystals", *Acta Crystallographica*, Vol. 4, No. 4, pp. 219–226, (1951); and Fergason in "Cholesteric Structure-I Optical Properties", *Molecular Crystals*, Vol. 1, pp. 293–307, (1966) describe in significant detail the optical activity of liquid crystals, which exhibit an extremely high degree of optical activity. Yariv and Yeh in *Optical Waves in Crystals*, Wiley and Sons, (1984), p. 94+ describe the optical activity of crystals.

Examples of optically active substances are: quartz, cinnabar, selenium, silver thiogallate, sodium chlorate, strychnine sulfate, sugar, tellurium, turpentine, and certain mesomorphic state organic compounds, particularly cholesteric liquid crystals.

Figure 9:
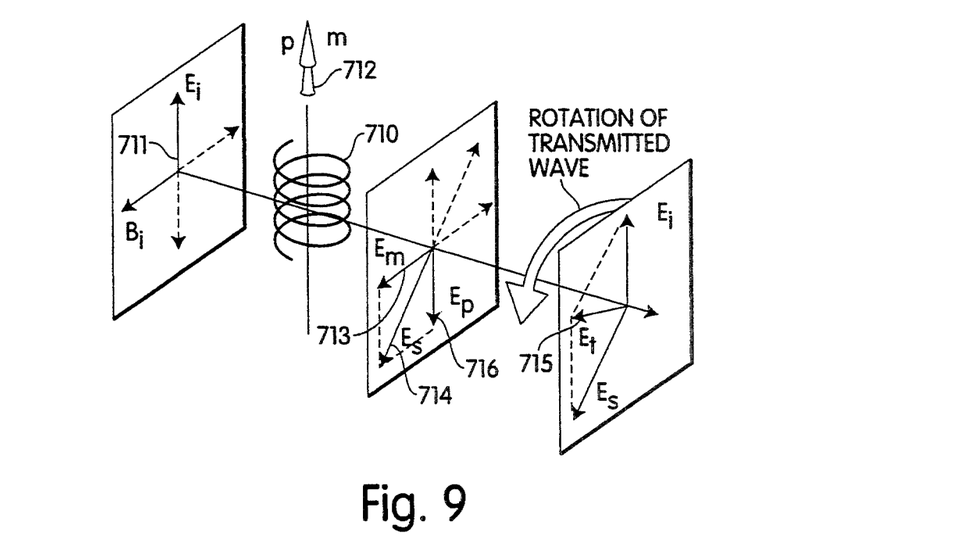
FIG. 9 illustrates the rotatory power of a dissymmetric substance.

The process of an optically active material rotating an electromagnetic wave is best described by referring to FIG. 9. Optically active material 710 has molecules that are, in this example, right-handed helixes. An electromagnetic wave is incident on the material with an electric field $E_i$, 711, that is parallel to the axis of the molecules. Field $E_i$ drives electron charges up and down along the path of the length of the molecule, producing a time varying dipole moment p(t), 712, parallel to the axis of the molecule. Additionally, there is an electric current caused by the spiraling motion of the electrons, which generates a time varying magnetic dipole moment m(t) that is also parallel to the axis of the molecule. Energy is being removed from the field and both time varying dipole moments will reradiate electromagnetic waves. An electric field $E_p$, 716, emitted by the electric dipole moment is perpendicular to the electric field $E_m$, 713, emitted by the magnetic dipole moment. The resultant field $E_s$, 714, which is the vector sum of $E_p$ and $E_m$, is scattered by the molecule's helix and is not parallel to the incident field $E_i$ along the direction of propagation. The plane of vibration of the resultant transmitted light $E_t$, 715, is the vector sum of planes of vibration of the incident field E and the scattered field $E_s$, and is rotated accordingly.

This rotation of plane of polarization phenomenon can be exploited advantageously as an optical switch or gate. In general, the optical switch includes an optical waveguide fabricated of an optically active material that rotates the plane of polarization of an optical input signal transmitted therethrough in the absence of an optical control signal and rotates the plane of polarization of the optical input signal to a lesser degree in response to an optical control signal. As used in this context, rotation of the plane of polarization "to a lesser degree" includes zero rotation.

Figure 10:
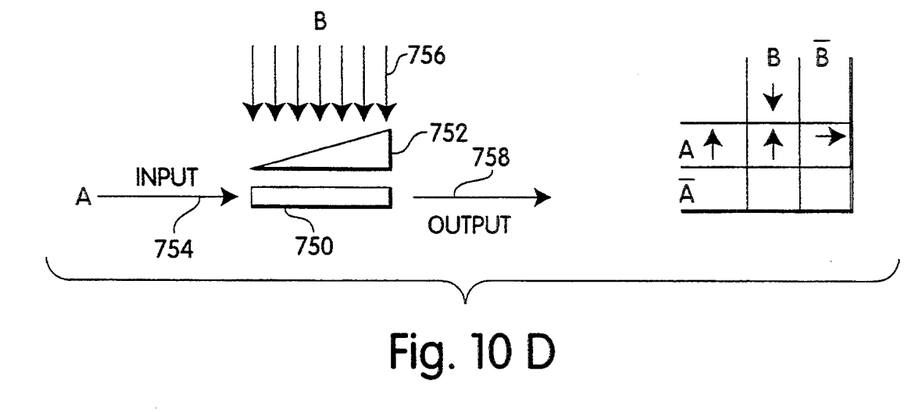
FIGS. 10A, 10B and 10C illustrate the generation of opposing dipole moments in an optically active substance by orthogonal optical signals.
FIG. 10D illustrates in schematic form a configuration of a gate with orthogonal optical signals.
Figure 10A:
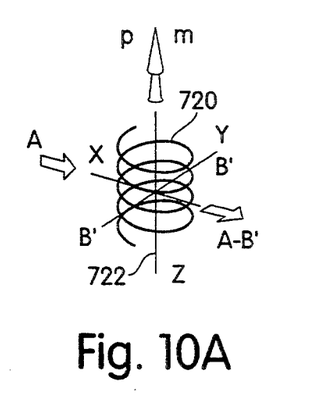
Figure 10B:
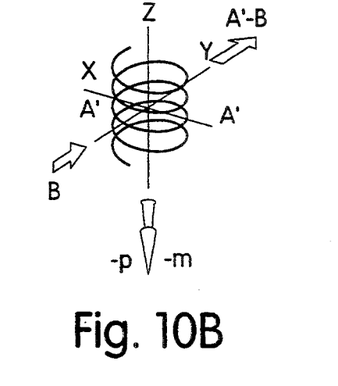
Figure 10C:
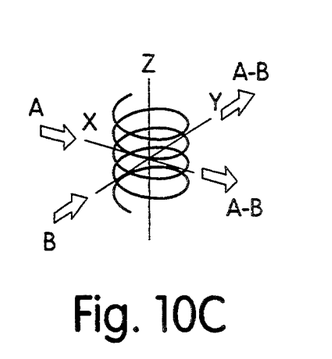

FIGS. 10A, 10B and 10C show in schematic form an AND gate with optical signals on two bitstreams, A and B, and an optically active substance, represented by helix 720, with an optical axis 722 (Z axis) that is orthogonal to the bitstreams. The substance is fabricated such that it has the minimum optical path length necessary to achieve rotation of $\pi/2$ radians. For a liquid crystal, which has a rotatory power as great as 40,000°/mm., the optical path length is on the order of 3 to 6 microns. The B optical signals and the A optical signals have a phase difference of $\pi$ radians. Not shown are focusing means, waveguides or the actual optically active substance.

In FIG. 10A, bitstream A is incident on the optically active substance along axis X. The field enters with a vertical plane of polarization, creating an electric dipole moment and magnetic dipole moment shown directed upwardly along the Z axis. Because of the rotation process described above, the wave is transmitted with a different plane of polarization as it exits the substance, shown as horizontal in this example.

In FIG. 10B, bitstream B is incident on the optically active substance along axis Y. Axis Y is orthogonal to axis X. Being $\pi$ radians different in phase with respect to bitstream A signals, the electric dipole p(t) and the magnetic dipole m(t) produced by bitstream B are antiparallel to the dipoles produced by bitstream A. Because of the rotation process described above, the wave is transmitted with a different plane of polarization as it exits the substance, shown as horizontal in this example.

When both bitstreams are present simultaneously, as depicted in FIG. 10C, the $\pi$ radians phase difference results in a "cancelling" of one set of electric and magnetic dipole moments by the other set. Consequently, $E_m$ and $E_p$ for both waves are zero. Therefore, $E_s$ for both directions of propagation is zero. The net result is that the incident fields $E_{iA}$ and $E_{iB}$ pass through the substance unrotated.

FIG. 10D illustrates in schematic form an AND gate based on orthogonal optical signals. An optically active crystal 750 is designed with a length along the optical path of optical signal A such that the plane of polarization of signal A will rotate $\pi/2$ radians. For a crystal with very high rotatory power, the length will be on the order of from one to three wavelengths. The wavefront for signal A propagates along the axis of the optical path, every point on the front having, by definition, the same phase. The B signal, being at an angle to the A signal, can be $\pi$ radians out of phase with respect to A at only one line (the intersection of two planes being a line) along any A wavefront. This intersection marks the position at which the electric and magnetic dipole moments are zero. On either side of this line, along the direction of the propagation path of the B signal, the dipole moments are not zero. Consequently, there is some rotational effect on the A signal as well as on the B signal. The objective is to make the width of the crystal, i.e., the optical path length of the B signal, as small as possible, say, on the order of one fifth of a wavelength or less.

A phase retarder 752 is wedge shaped and is designed such that as signal A propagates through the crystal. The optical signal B, which passes through retarder 752, is everywhere along the optical path of A exactly $\pi$ radians out of phase with respect to signal A. That is to say, the time for signal B to pass through the thick end of the wedge is equal to the time it takes for signal A to pass through the optically active crystal.

Referring to FIG. 10D, signal A input is shown as optical path 754. Signal B is shown as optical path 756. (The effects of refraction of the B wavefront in the phase retarder 752 are not shown in FIG. 10D.) Signal A output is shown as optical path 758. Signal B is transformed by retarder 752 and then is incident orthogonally to optical path A in crystal 750.

An A signal is polarized in the vertical plane. An A' signal is null. A B signal is polarized in the same plane as the A signal but $\pi$ radians out of phase with respect to the A signal. A B' signal is null. The truth table illustrates three possible outcomes for the four input conditions.

Even with crystals that have the greatest rotatory power, the optical path length to achieve rotation of $\pi/2$ radians would be on the order of three wavelengths. However, the distance on either side of a node of a standing wave where the sum effect of two opposing fields results in negligible electronic activity is 1/5th of a wavelength or less. Therefore, neglecting reflection and absorption losses, a gate with 30 stations would be required to achieve rotation of $\pi/2$ radians.

Figure 11:
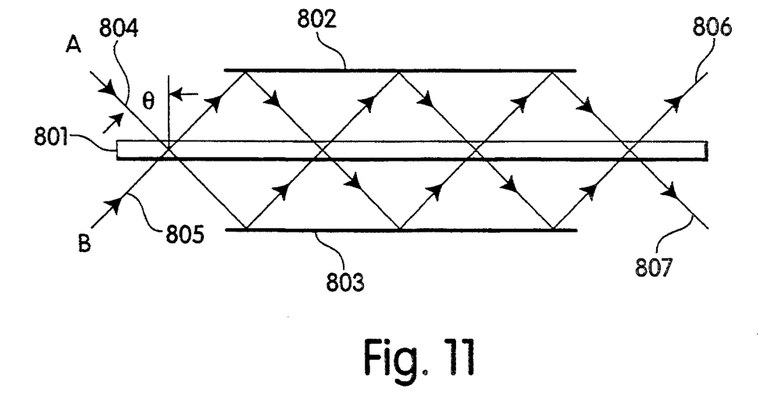
FIG. 11 illustrates in schematic form a configuration of a gate with nearly anti-parallel optical signals.

FIG. 11 illustrates a possible configuration for such a gate. A thin film of optically active material 801 is positioned between two reflecting surfaces 802 and 803. Optical signal A enters the system on a path 804, passes through the film, reflects from surface 803, passes through the film, reflects from surface 802, passes through the film, and so on until it emerges from the system on path 806. If there is no B signal, the A signal rotates an incremental amount with each transit of the film and emerges rotated $\pi/2$ radians. Similarly, for optical B signal. If both A and B are present and create a stationary standing wave, neither will rotate.

The example shows the angle of reflection, $\Theta$, being 45° from the normal and the angle of intersection being 90°, which would provide less than completely satisfactory results. The angle $\Theta$ should be close to 0° and the angle of intersection should be greater than 150° and preferably nearly 180°. Also, the electric field created by the incident waves should be perpendicular to the plane of incidence to maximize reflection. The optical path length between each surface and the film is a multiple of $\lambda/4$.

Figure 12A:
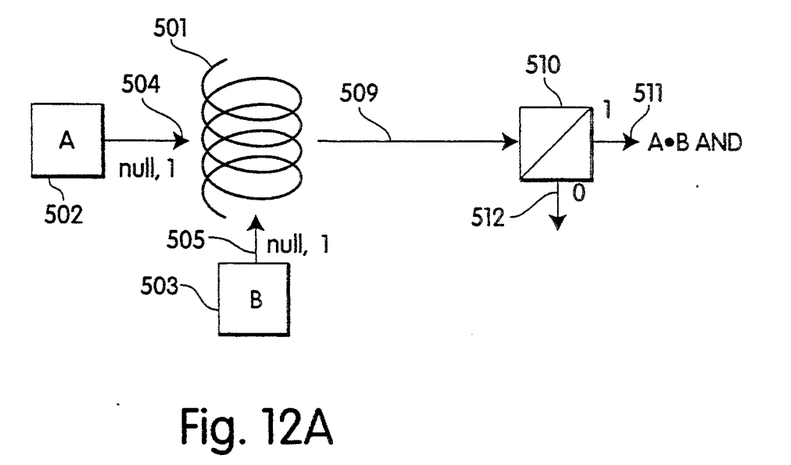
FIGS. 12A and 12B show in schematic form boolean logic gates based on optically active substances operating on optical signals.
Figure 12B:
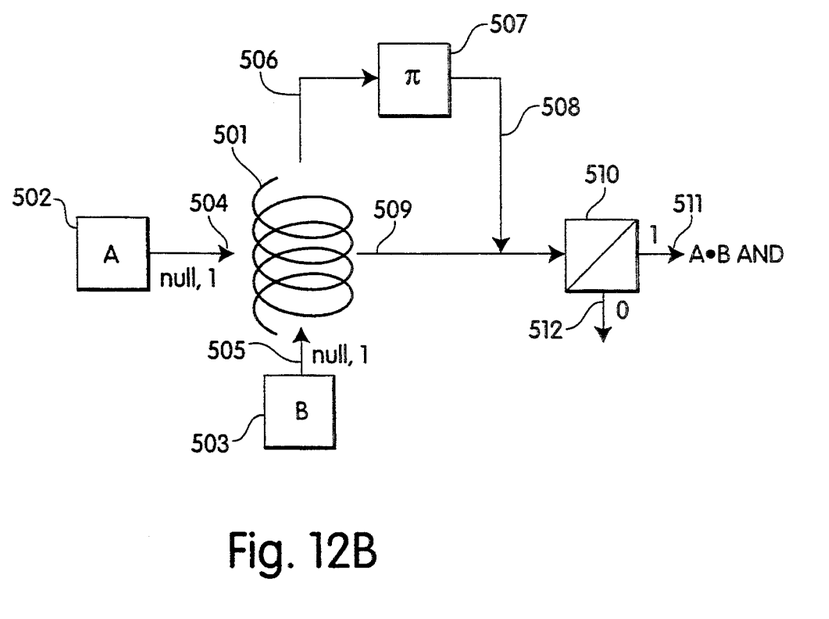

FIGS. 12A and 12B illustrate in schematic form logic gates based on optical rotative powers of dissymmetric substances. In all the following examples, the source signal is either a logic 1 or else a null, null being equivalent to logic 0.

The gate in FIG. 12A is applicable for configurations where the two optical paths are orthogonal to each other and there is a $\pi$ radians phase difference between the input optical signals. A dissymmetric substance 901 operates on optical signals from a source 902, bitstream A, via waveguide 904 and from source 903, bitstream B, via waveguide 905. Waveguide 909 conveys A bitstream signals that have been processed to plane of polarization separator 910. Optical signals with logic state 1, which is the result of an A and a B signal, are output on a waveguide 911 as the AND signal. Optical signals with logic state 0, which is the result of either an A and B' (null) are conveyed by waveguide 912 and discarded.

The gate in FIG. 12B is applicable for the configuration where the two bitstreams are nearly anti-parallel and have $\pi$ radians phase difference between them. The operation of the gate is identical to the operation of the gate shown in FIG. 12A, except that the B output optical signals are useful. The B output signals are conveyed by waveguide 906 to a retarder 907 where they are retarded by $\pi$ radians and carried via waveguide 908 and combined with the A output signals.

The gates described above are limited to performing AND boolean logic.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Optical switching apparatus comprising:
   a semi-transparent metallic film;
   means for directing a first optical signal at a first spot on one side of said film;
   means for directing a second optical signal at a second spot on the other side of said film, said first and second spots being located directly opposite each other on said film; and
   means for combining as an output signal a portion of said first optical signal that is transmitted through said film and a portion of said second optical signal that is reflected by said film.

2. Optical switching apparatus as defined in claim 1 wherein said first and second optical signals are directed at said semi-transparent metallic film along paths that are perpendicular to the plane of said film.

3. Optical switching apparatus as defined in claim 1 wherein said first and second optical signals are directed at said semi-transparent metallic film along paths that are oriented at oblique angles to the plane of said film.

4. Optical switching apparatus as defined in claim 1 wherein said first and second optical signals are conveyed to said semi-transparent metallic film on integrated optical waveguides.

5. Optical switching apparatus as defined in claim 1 further including means for subtracting from said output signal the portion of said first optical signal that is transmitted through said film when said second optical signal is absent and for subtracting from said output signal the portion of said second optical signal that is reflected by said film when said first optical signal is absent.

6. Optical switching apparatus as defined in claim 1 wherein said semi-transparent metallic film is selected from a group consisting of antimony, beryllium, chromium, cobalt, iron, molybdenum, nickel, niobium, palladium, platinum, rhenium, tantalum, titanium, and tungsten.

7. Optical switching apparatus as defined in claim 1 wherein said semi-transparent metallic film has a thickness in a range of about 0.01 to 0.5 times the wavelength of said first and second optical signals.

8. Optical switching apparatus as defined in claim 1 wherein said first and second optical signals are polarized parallel to the plane of incidence to the surfaces of said semi-transparent metallic film.

9. Optical switching apparatus as defined in claim 1 wherein said first and second optical signals are polarized perpendicular to the plane of incidence to the surfaces of said film.

10. Optical switching apparatus as defined in claim 1 wherein said semi-transparent metallic film has an index of refraction with real and imaginary components that are nearly equal and are greater than two.

11. Optical switching apparatus as defined in claim 1 wherein said semi-transparent metallic film is positioned such that said first and second optical signals form a standing wave having a node at the midplane of said film.

12. Optical switching apparatus as defined in claim 1 which functions as an AND gate for processing said first and second optical signals.

13. Optical switching apparatus comprising:
first and second optical waveguides that abut opposite sides of a semi-transparent metallic film over a predetermined length and are parallel over said predetermined length;
means for directing a first optical signal through said first optical waveguide;
means for directing a second optical signal through said second optical waveguide; and
means for combining as an output signal a portion of said first optical signal that is transmitted through said film and a portion of said second optical signal that is reflected by said film.

14. Optical switching apparatus as defined in claim 13 wherein said first and second optical waveguides comprise optical fibers, each including a core and a cladding, a portion of the cladding of each optical fiber abutting said semi-transparent metallic film.

15. Optical switching apparatus as defined in claim 13 further including means for subtracting from said output signal the portion of said first optical signal that is transmitted through said film when said second optical signal is absent and for subtracting from said output signal the portion of said second optical signal that is reflected by said film when said first optical signal is absent.

16. Optical switching apparatus as defined in claim 13 wherein said semi-transparent metallic film is selected from a group consisting of antimony, beryllium, chromium, cobalt, iron, molybdenum, nickel, niobium, palladium, platinum, rhenium, tantalum, titanium, and tungsten.

17. Optical switching apparatus as defined in claim 13 wherein said semi-transparent metallic film has a thickness in a range of about 0.01 to 0.5 times the wavelength of said first and second optical signals.

18. Optical switching apparatus as defined in claim 13 wherein said predetermined length is in a range of about 0.05 millimeter to 2 millimeters.

19. Optical switching apparatus as defined in claim 14 wherein the distance between the centers of the first and second optical waveguides is in a range of about ½ to 3 times the diameter of the core.

20. Optical switching apparatus as defined in claim 13 wherein said first and second optical signals are polarized parallel to the plane of incidence to the surfaces of said semi-transparent metallic film.

21. Optical switching apparatus as defined in claim 13 wherein said first and second optical signals are polarized perpendicular to the plane of incidence to the surfaces of said semi-transparent metallic film.

22. Optical switching apparatus as defined in claim 13 wherein said semi-transparent metallic film has an index of refraction with real and imaginary components that are nearly equal and are greater than two.

23. Optical switching apparatus as defined in claim 13 wherein said first and second optical signals produce a null standing wave in said semi-transparent metallic film.

24. Optical switching apparatus as defined in claim 13 which functions as an AND gate for processing said first and second optical signals.

25. Optical switching apparatus comprising:
at least one semi-transparent film with an index of refraction that has both real and imaginary components;
means for directing a first optical signal at a first spot on one surface of said film, where a first portion of said first optical signal is reflected from the surface of said film, a second portion of said first optical signal is transmitted through said film and a third portion of said first optical signal is absorbed in said film;
means for directing a second optical signal at a second spot on the other surface of said film, said first and second spots being located directly opposite each other on said film, and where a first portion of said second optical signal is reflected from the surface of said film, a second portion of said second optical signal is transmitted through said film and a third portion of said second optical signal is absorbed in said film;
means for positioning a null of the resultant stationary wave when said first optical signal and said second optical signal are directed simultaneously at said film, said position of said null being located at the mid-plane of said film; and
means for conveying the portion of said first optical signal transmitted through said film as a first output signal.

26. Optical switching apparatus as defined in claim 25 further including means for conveying the portion of said second optical signal transmitted through the film as a second output signal.

27. Optical switching apparatus as defined in claim 26 further including means for combining said first output signal with said second output signal.

28. Optical switching apparatus as defined in claim 25 wherein said first and second optical signals are directed at said semi-transparent film along paths that are perpendicular to the plane of said film.

29. Optical switching apparatus as defined in claim 25 wherein said first and second optical signals are directed at said semi-transparent film along paths that are oriented at oblique angles to the plane of said film, said first and second optical signals having equal angles of incidence on said film.

30. Optical switching apparatus as defined in claim 25 wherein said first and second optical signals are conveyed to said semi-transparent film on integrated optical waveguides.

31. Optical switching apparatus as defined in claim 25 further including means for combining said first output signal with said first portion of said first optical signal that is reflected from the surface of said film such that the combined signals interfere destructively and said first output signal is null when said second optical signal is absent.

32. Optical switching apparatus as defined in claim 26 further including means for combining said second output signal with said first portion of said second optical signal that is reflected from the surface of said film such that the combined signals interfere destructively and said second output signal is null when said first optical signal is absent.

33. Optical switching apparatus as defined in claim 25 wherein said semi-transparent film comprises a material selected from a group consisting of antimony, beryllium, chromium, cobalt, iron, molybdenum, nickel, niobium, palladium, platinum, rhenium, tantalum, titanium, and tungsten.

34. Optical switching apparatus as defined in claim 25 wherein said semi-transparent film has a thickness in a range of about 0.01 to 0.5 times the wavelength of said first and second optical signals.

35. Optical switching apparatus as defined in claim 25 wherein said first and second optical signals are polarized parallel to the plane of incidence to the surfaces of said semi-transparent film.

36. Optical switching apparatus as defined in claim 25 wherein said first and second optical signals are polarized perpendicular to the plane of incidence to the surfaces of said semi-transparent film.

37. Optical switching apparatus as defined in claim 25 wherein said semi-transparent film has an index of refraction with real and imaginary components that are nearly equal and are greater than two.

38. Optical switching apparatus as defined in claim 25 which functions as an AND gate for processing said first and second optical signals.

39. Optical switching apparatus comprising:
a semi-transparent film with an index of refraction that has both real and imaginary components;
first and second waveguides that abut opposite surfaces of said film over a predetermined length and are parallel over said predetermined length;
means for directing a first optical signal through said first optical waveguide, where a first portion of said first optical signal is reflected from the surface of said film, a second portion of said first optical signal is transmitted through said film and a third portion of said first optical signal is absorbed in said film;
means for combining a portion of said first optical signal with said first portion of said first optical signal that is reflected from said film such that said portions destructively interfere and result in a first null signal;
means for directing a second optical signal that is $\pi$ radians out of phase with respect to said first optical signal through said second optical waveguide, where a first portion of said second optical signal is reflected from the surface of said film, a second portion of said second optical signal is transmitted through said film and a third portion of said second optical signal is absorbed in said film;
means for combining fields of said first and second optical signals in said film resulting in a null field in said film;
means for combining a portion of said second optical signal with said second portion of said second optical signal transmitted through said film such that said portions destructively interfere and result in a second null signal; and
means for combining said first and second null signals with said second portion of said second signal that is transmitted through said film.

40. Optical switching apparatus as defined in claim 39 further including,
means for combining a portion of said first optical signal with said second portion of said first optical signal transmitted through said film such that said portions destructively interfere and result in a third null signal;
means for combining a portion of said second optical signal with said first portion of said second optical signal reflected from said film such that said portions destructively interfere and result in a fourth null signal; and
means for combining said first, second, third and fourth null signals with said second portion of said first optical signal and said second portion of said second optical signal that are transmitted through said film.

41. Optical switching apparatus as defined in claim 39 wherein said first and second optical waveguides comprise optical fibers, each including a core and a cladding, a portion of the cladding of each optical fiber abutting said semi-transparent film.

42. Optical switching apparatus as defined in claim 39 wherein said semi-transparent film comprises a material selected from a group consisting of antimony, beryllium, chromium, cobalt, iron, molybdenum, nickel, niobium, palladium, platinum, rhenium, tantalum, titanium, and tungsten.

43. Optical switching apparatus as defined in claim 39 wherein said semi-transparent film has a thickness in a range of about 0.01 to 0.5 times the wavelength of said first and second optical signals.

44. Optical switching apparatus as defined in claim 39 wherein said predetermined length is in a range of about 0.05 millimeter to 2 millimeters.

45. Optical switching apparatus as defined in claim 39 wherein the distance between the centers of the first and second optical waveguides is in a range of about $\frac{1}{2}$ to 3 times the diameter of the core.

46. Optical switching apparatus as defined in claim 39 wherein said first and second optical signals are polarized parallel to the plane of incidence to the surfaces of said semi-transparent film.

47. Optical switching apparatus as defined in claim 39 wherein said first and second optical signals are polarized perpendicular to the plane of incidence to the surfaces of said semi-transparent film.

48. Optical switching apparatus as defined in claim 39 wherein said semi-transparent film has an index of refraction with real and imaginary components that are nearly equal and are greater than two.

49. Optical switching apparatus as defined in claim 39 which functions as an AND gate for processing said first and second optical signals.

* * * * *